(12) United States Patent
Kajiwara

(10) Patent No.: US 7,783,119 B2
(45) Date of Patent: Aug. 24, 2010

(54) IMAGE ENCODING APPARATUS, IMAGE DECODING APPARATUS AND CONTROL METHOD THEREFOR

(75) Inventor: Hiroshi Kajiwara, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 839 days.

(21) Appl. No.: 11/683,033

(22) Filed: Mar. 7, 2007

(65) Prior Publication Data

US 2007/0217703 A1    Sep. 20, 2007

(30) Foreign Application Priority Data

Mar. 17, 2006    (JP)    ............................. 2006-075544

(51) Int. Cl.
   *G06K 9/36*    (2006.01)
(52) U.S. Cl. .................................... 382/238
(58) Field of Classification Search ......... 382/232–233, 382/236, 238–252; 348/384.1, 387.1, 390.1, 348/394.1–395.1, 406.1–410.1, 415.1–416.1, 348/420.1–421.1; 358/426.2, 426.04, 426.05, 358/426.06, 426.11, 539; 375/240.01–240.03, 375/240.06, 240.08, 240.11–240.12, 240.18–240.19, 375/240.23–240.25; 341/50–51, 65, 67, 341/79, 107
See application file for complete search history.

(56) References Cited

U.S. PATENT DOCUMENTS

| 5,945,930 | A |   | 8/1999 | Kajiwara ..................... 341/50 |
| 5,960,116 | A | * | 9/1999 | Kajiwara ..................... 382/238 |
| 6,028,963 | A |   | 2/2000 | Kajiwara ..................... 382/239 |
| 6,031,938 | A |   | 2/2000 | Kajiwara ..................... 382/239 |
| 6,101,282 | A |   | 8/2000 | Hirabayashi et al. ......... 382/246 |
| 6,233,355 | B1 |   | 5/2001 | Kajiwara ..................... 382/238 |
| 6,310,980 | B1 |   | 10/2001 | Kajiwara ..................... 382/238 |
| 6,501,859 | B1 |   | 12/2002 | Kajiwara ..................... 382/239 |
| 6,549,676 | B1 |   | 4/2003 | Nakayama et al. .......... 382/246 |
| 6,560,365 | B1 |   | 5/2003 | Nakayama et al. .......... 382/233 |
| 6,628,717 | B1 |   | 9/2003 | Jeong et al. |
| 6,665,444 | B1 |   | 12/2003 | Kajiwara ..................... 382/240 |
| 6,711,295 | B2 |   | 3/2004 | Nakayama et al. .......... 382/232 |

(Continued)

FOREIGN PATENT DOCUMENTS

KR    1020000031178  A1    5/2000

OTHER PUBLICATIONS

Korean Search Report dated Jan. 25, 2008.

*Primary Examiner*—Jose L Couso
(74) *Attorney, Agent, or Firm*—Fitzpatrick, Cella, Harper & Scinto

(57) ABSTRACT

The present invention is able to determine an encoding parameter using a simple method with little processing load or memory cost, and enables encoding of image data with excellent compression performance. To this end, a prediction error generating unit of an encoding apparatus according to the present invention calculates the difference (prediction error) between a pixel of interest and a predicted value. A prediction order conversion unit converts the prediction error to a non-negative integer, and outputs the non-negative integer as a prediction order M(e). A Golomb encoding unit performs encoding in accordance with a k parameter supplied from a k parameter updating unit. The k parameter updating unit updates the k parameter for use in the next updating based on the prediction order M(e) of the pixel of interest and the k parameter supplied to the Golomb encoding unit.

12 Claims, 17 Drawing Sheets

U.S. PATENT DOCUMENTS

| | | |
|---|---|---|
| 6,768,819 B2 | 7/2004 | Yamazaki et al. ............ 382/240 |
| 6,847,735 B2 | 1/2005 | Kajiwara et al. ............. 382/233 |
| 6,879,726 B2 | 4/2005 | Sato et al. .................... 382/239 |
| 6,879,727 B2 | 4/2005 | Sato et al. .................... 382/238 |
| 6,912,319 B1 * | 6/2005 | Barnes et al. ................ 382/240 |
| 6,917,716 B2 | 7/2005 | Kajiwara et al. ............. 382/240 |
| 6,947,600 B1 | 9/2005 | Sato et al. .................... 382/233 |
| 6,985,630 B2 | 1/2006 | Kajiwara .................... 382/233 |
| 7,013,050 B2 | 3/2006 | Kajiwara .................... 382/240 |
| 7,031,536 B2 | 4/2006 | Kajiwara .................... 382/238 |
| RE39,984 E * | 1/2008 | Kajiwara .................... 382/239 |
| 7,567,719 B2 * | 7/2009 | Kalevo et al. ................ 382/238 |
| 2004/0013312 A1 | 1/2004 | Kajiwara .................... 382/240 |
| 2004/0213347 A1 | 10/2004 | Kajiwara ................ 382/240.11 |
| 2005/0100226 A1 | 5/2005 | Kajiwara et al. ............. 382/232 |
| 2005/0249283 A1 | 11/2005 | Kajiwara et al. ....... 375/240.12 |
| 2006/0013304 A1 | 1/2006 | Maeda et al. .......... 375/240.11 |
| 2006/0045362 A1 | 3/2006 | Ito et al. ...................... 382/232 |
| 2006/0210176 A1 | 9/2006 | Kajiwara et al. ............. 382/232 |
| 2006/0262982 A1 | 11/2006 | Matsumoto et al. ......... 382/238 |
| 2007/0160299 A1 | 7/2007 | Kajiwara et al. ............. 382/240 |
| 2007/0217703 A1 | 9/2007 | Kajiwara .................... 382/238 |

* cited by examiner

FIG. 2

| DIFFERENCE VALUE RANGE | QUANTIZED DIFFERENCE VALUE |
|---|---|
| $\leq -T3$ | −4 |
| $-T2 \sim -T3+1$ | −3 |
| $-T1 \sim -T2+1$ | −2 |
| $-1 \sim -T1+1$ | −1 |
| 0 | 0 |
| $1 \sim T1-1$ | 1 |
| $T1 \sim T2-1$ | 2 |
| $T2 \sim T3-1$ | 3 |
| $\geq T3$ | 4 |

FIG. 3

|  | c | b | d |
|---|---|---|---|
|  | a | x |  |

FIG. 5A

| SYMBOL | k=0 CODE LENGTH | k=1 CODE LENGTH | k=2 CODE LENGTH | k=3 CODE LENGTH | k=4 CODE LENGTH | k=5 CODE LENGTH |
|---|---|---|---|---|---|---|
| 0 | 1 | 2 | 3 | 4 | 5 | 6 |
| 1 | 2 | 2 | 3 | 4 | 5 | 6 |
| 2 | 3 | 3 | 3 | 4 | 5 | 6 |
| 3 | 4 | 3 | 3 | 4 | 5 | 6 |
| 4 | 5 | 4 | 4 | 4 | 5 | 6 |
| 5 | 6 | 4 | 4 | 4 | 5 | 6 |
| 6 | 7 | 5 | 4 | 4 | 5 | 6 |
| 7 | 8 | 5 | 4 | 4 | 5 | 6 |
| 8 | 9 | 6 | 5 | 5 | 5 | 6 |
| 9 | 10 | 6 | 5 | 5 | 5 | 6 |
| 10 | 11 | 7 | 5 | 5 | 5 | 6 |
| 11 | 12 | 7 | 5 | 5 | 5 | 6 |
| 12 | 13 | 8 | 6 | 5 | 5 | 6 |
| 13 | 14 | 8 | 6 | 5 | 5 | 6 |
| 14 | 15 | 9 | 6 | 5 | 5 | 6 |
| 15 | 16 | 9 | 6 | 5 | 5 | 6 |
| 16 | 17 | 10 | 7 | 6 | 6 | 6 |
| 17 | 18 | 10 | 7 | 6 | 6 | 6 |
| 18 | 19 | 11 | 7 | 6 | 6 | 6 |
| 19 | 20 | 11 | 7 | 6 | 6 | 6 |
| 20 | 21 | 12 | 8 | 6 | 6 | 6 |
| 21 | 22 | 12 | 8 | 6 | 6 | 6 |
| 22 | 23 | 13 | 8 | 6 | 6 | 6 |
| 23 | 24 | 13 | 8 | 6 | 6 | 6 |
| 24 | 25 | 14 | 9 | 7 | 6 | 6 |
| 25 | 26 | 14 | 9 | 7 | 6 | 6 |
| 26 | 27 | 15 | 9 | 7 | 6 | 6 |
| 27 | 28 | 15 | 9 | 7 | 6 | 6 |
| 28 | 29 | 16 | 10 | 7 | 6 | 6 |

FIG. 5B

| SYMBOL | k=0 CODE LENGTH | k=0 CORRECTION VALUE | k=1 CODE LENGTH | k=1 CORRECTION VALUE | k=2 CODE LENGTH | k=2 CORRECTION VALUE | k=3 CODE LENGTH | k=3 CORRECTION VALUE | k=4 CODE LENGTH | k=4 CORRECTION VALUE | k=5 CODE LENGTH | k=5 CORRECTION VALUE |
|---|---|---|---|---|---|---|---|---|---|---|---|---|
| 0 | 1 | 0 | 2 | -1 | 3 | -1 | 4 | -1 | 5 | -1 | 6 | -1 |
| 1 | 2 | 0 | 2 | 0 | 3 | -1 | 4 | -1 | 5 | -1 | 6 | -1 |
| 2 | 3 | 0 | 3 | 0 | 3 | 0 | 4 | -1 | 5 | -1 | 6 | -1 |
| 3 | 4 | +1 | 3 | 0 | 4 | 0 | 4 | -1 | 5 | -1 | 6 | -1 |
| 4 | 5 | +1 | 4 | 0 | 4 | 0 | 4 | 0 | 5 | -1 | 6 | -1 |
| 5 | 6 | +1 | 4 | 0 | 4 | 0 | 4 | 0 | 5 | -1 | 6 | -1 |
| 6 | 7 | +1 | 5 | +1 | 4 | 0 | 4 | 0 | 5 | -1 | 6 | -1 |
| 7 | 8 | +1 | 5 | +1 | 5 | 0 | 4 | 0 | 5 | -1 | 6 | -1 |
| 8 | 9 | +1 | 6 | +1 | 5 | 0 | 4 | 0 | 5 | -1 | 6 | -1 |
| 9 | 10 | +1 | 6 | +1 | 5 | 0 | 5 | 0 | 5 | -1 | 6 | -1 |
| 10 | 11 | +1 | 7 | +1 | 5 | 0 | 5 | 0 | 5 | -1 | 6 | -1 |
| 11 | 12 | +1 | 7 | +1 | 6 | +1 | 5 | 0 | 5 | -1 | 6 | -1 |
| 12 | 13 | +1 | 8 | +1 | 6 | +1 | 5 | 0 | 5 | -1 | 6 | -1 |
| 13 | 14 | +1 | 8 | +1 | 6 | +1 | 5 | 0 | 5 | -1 | 6 | -1 |
| 14 | 15 | +1 | 9 | +1 | 6 | +1 | 5 | 0 | 5 | -1 | 6 | -1 |
| 15 | 16 | +1 | 9 | +1 | 7 | +1 | 6 | 0 | 5 | -1 | 6 | -1 |
| 16 | 17 | +1 | 10 | +1 | 7 | +1 | 6 | 0 | 6 | 0 | 6 | 0 |
| 17 | 18 | +1 | 10 | +1 | 7 | +1 | 6 | 0 | 6 | 0 | 6 | 0 |
| 18 | 19 | +1 | 11 | +1 | 8 | +1 | 6 | 0 | 6 | 0 | 6 | 0 |
| 19 | 20 | +1 | 11 | +1 | 8 | +1 | 6 | 0 | 6 | 0 | 6 | 0 |
| 20 | 21 | +1 | 12 | +1 | 8 | +1 | 6 | 0 | 6 | 0 | 6 | 0 |
| 21 | 22 | +1 | 12 | +1 | 8 | +1 | 6 | 0 | 6 | 0 | 6 | 0 |
| 22 | 23 | +1 | 13 | +1 | 9 | +1 | 6 | 0 | 6 | 0 | 6 | 0 |
| 23 | 24 | +1 | 13 | +1 | 9 | +1 | 6 | 0 | 6 | 0 | 6 | 0 |
| 24 | 25 | +1 | 14 | +1 | 9 | +1 | 7 | +1 | 6 | 0 | 6 | 0 |
| 25 | 26 | +1 | 14 | +1 | 9 | +1 | 7 | +1 | 6 | 0 | 6 | 0 |
| 26 | 27 | +1 | 15 | +1 | 10 | +1 | 7 | +1 | 6 | 0 | 6 | 0 |
| 27 | 28 | +1 | 15 | +1 | 10 | +1 | 7 | +1 | 6 | 0 | 6 | 0 |
| 28 | 29 | +1 | 16 | +1 | 10 | +1 | 7 | +1 | 6 | 0 | 6 | 0 |

FIG. 6

| SYMBOL FOR ENCODING | ENCODING PARAMETER k | UPDATING | k PARAMETER (UPDATED) |
|---|---|---|---|
| 0 | 2 (INITIAL VALUE) | −1 | 1 |
| 0 | 1 | −1 | 0 |
| 2 | 0 | — | 0 |
| 0 | 0 | — | 0 |
| 0 | 0 | — | 0 |
| 1 | 0 | — | 0 |
| 0 | 0 | — | 0 |
| 3 | 0 | +1 | 1 |
| 0 | 1 | −1 | 0 |
| ... | ... | ... | ... |

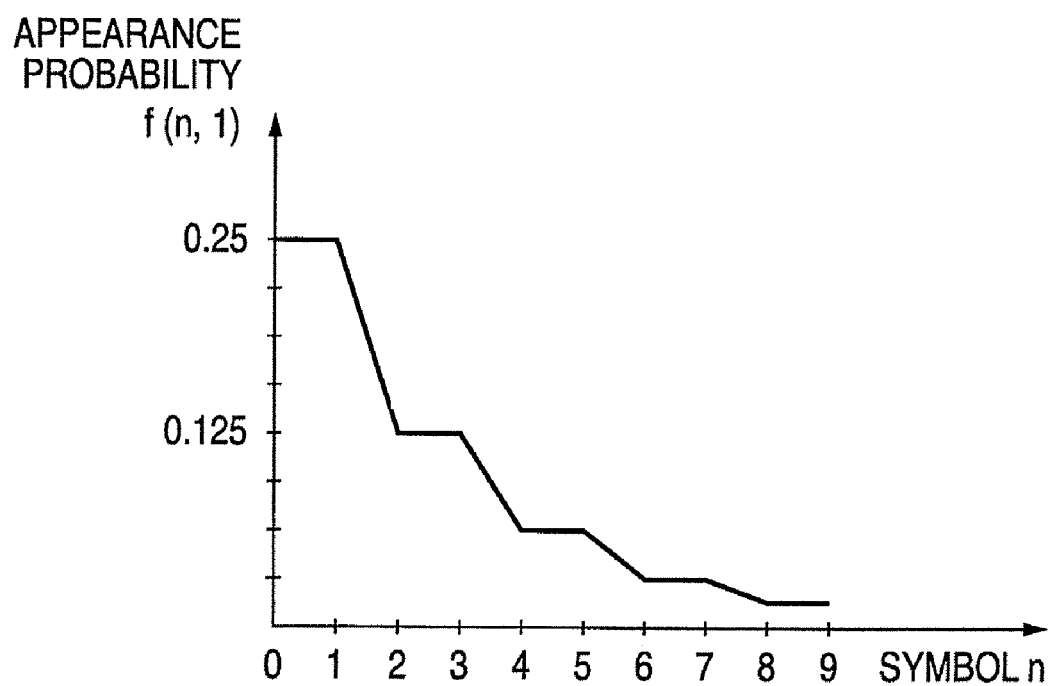

if k=0 if k>0

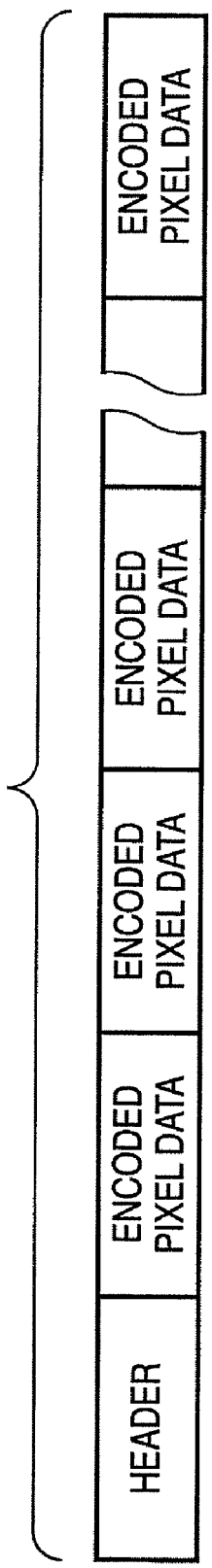

FIG. 12

| INDEX i | PARAMETER k | INDEX i | PARAMETER k |
|---|---|---|---|
| 0 | 0 | 15 | 6 |
| 1 | 1 | 16 | 6 |
| 2 | 1 | 17 | 6 |
| 3 | 2 | 18 | 6 |
| 4 | 2 | 19 | 7 |
| 5 | 3 | 20 | 7 |
| 6 | 3 | 21 | 7 |
| 7 | 4 | 22 | 7 |
| 8 | 4 | 23 | 8 |
| 9 | 4 | | |
| 10 | 4 | | |
| 11 | 5 | | |
| 12 | 5 | | |
| 13 | 5 | | |
| 14 | 5 | | |

FIG. 16

| n\k | 0 VARIABLE LENGTH | 0 FIXED LENGTH | 1 VARIABLE LENGTH | 1 FIXED LENGTH | 2 VARIABLE LENGTH | 2 FIXED LENGTH | 3 VARIABLE LENGTH | 3 FIXED LENGTH |
|---|---|---|---|---|---|---|---|---|
| 0 | 1 | | 1 | 0 | 1 | 00 | 1 | 000 |
| 1 | 01 | | 1 | 1 | 1 | 01 | 1 | 001 |
| 2 | 001 | | 01 | 0 | 1 | 10 | 1 | 010 |
| 3 | 0001 | | 01 | 1 | 1 | 11 | 1 | 011 |
| 4 | 00001 | | 001 | 0 | 01 | 00 | 1 | 100 |
| 5 | 000001 | | 001 | 1 | 01 | 01 | 1 | 101 |
| 6 | 0000001 | | 0001 | 0 | 01 | 10 | 1 | 010 |
| 7 | 00000001 | | 0001 | 1 | 01 | 11 | 01 | 011 |
| 8 | 000000001 | | 00001 | 0 | 001 | 00 | | 000 |
| ... | ... | | ... | ... | ... | ... | ... | ... |

IMAGE ENCODING APPARATUS, IMAGE DECODING APPARATUS AND CONTROL METHOD THEREFOR

BACKGROUND OF THE INVENTION

1. Field of the Invention

The present invention relates to image encoding apparatus, image decoding apparatus and control method therefor.

2. Description of the Related Art

There are forms of entropy encoding used in image encoding that employ a static probability distribution model and those that use a dynamic model. Those using a static probability distribution model prepare a probability distribution model in advance by examining or postulating the nature of the information source, and perform suitable encoding for that model. Those using a dynamic probability distribution model learn the nature of the information source during the encoding process, and perform encoding while at the same time dynamically changing the probability distribution model.

Two examples of lossless coding of multivalued images are given here.

With a lossless coding system prescribed by JPEG and recommended by ISO and ITU-T as an international standard coding system for continuous-tone still images, a static model is used whereby encoding is performed using a Huffman table in which the differences between pixels of interest and predicted values are predetermined.

On the other hand, Part 1 of JPEG-LS recommended by ISO and ITU-T as an international standard system for lossless and near-lossless compression of continuous-tone still images is an exemplary dynamic model. JPEG-LS employs a Golomb encoding technique in prediction error coding, Golomb encoding being compatible with probability distributions that differ as a result of changing the encoding parameters. The probability distribution model is changed dynamically for every context determined from four pixels neighboring the pixel of interest, by selecting "k" with reference to the probability distribution condition of encoded symbols.

The overall flow of prediction error coding in JPEG-LS and a method for determining the Golomb encoding parameter will be described below. Note that in the following description, matters not directly related to the present invention, such as the run mode applied if pixels neighboring the pixel of interest all have the same pixel value or the quantization process for near-lossless coding, have been omitted. Reference should be made to the written standards for details on the standard system.

FIG. 3 shows the relative positional relation between the pixel of interest "x" and neighboring pixels a, b, c and d referred to by JPEG-LS. Attention is drawn to the fact that because the pixels are encoded in raster scan order, the pixels a, b, c and d neighboring the pixel of interest "x" have all been encoded. The values of the pixels are also expressed by a, b, c and d. Firstly, the differences between a and c, c and b, and b and d are derived to obtain D1, D2, and D3.

$D1 = d - b$ $D2 = b - c$ $D3 = c - a$

The difference values D1, D2 and D3 are quantized in nine ways (from −4 to 4) to derive quantized values Q1, Q2 and Q3 of the respective differences. The correspondence of the range of the difference values and the quantized values are shown in FIG. 2. T1, T2 and T3 are predetermined non-negative integer values.

For example, the values T1=3, T2=7 and T3=21 are set in relation to 8-bit images that take values 0 to 255. 9×9×9=729 combinations (Q1, Q2, Q3) of Q1, Q2 and Q3 are thereby obtained, since it is possible for Q1, Q2 and Q3 to each have nine values from −4 to 4.

Here, the probability of the prediction error e occurring in the state (Q1, Q2, Q3) is considered the same as the probability of the prediction error −e occurring in the state (−Q1, −Q2, −Q3). Consequently, integrating these two states reduces the number of combinations to 365. Information showing this combination is the above context. An identifier expressing the 365 states is assumed to be S, and hereinafter this identifier S will be called a state number.

On the other hand, a predicted value p with respect to the value x of the pixel of interest is derived by the following equation using the neighboring pixels a, b and c.

$p = \min(a,b)$ (if $\max(a,b) \leq c$) or $p = \max(a,b)$ (if $\min(a,b) \geq c$) or $p = a + b - c$ (none of the above)

Here, min(x,y) is a function that returns the smaller of x and y, and max(x,y) is a function that returns the larger of x and y.

Attention is drawn to the fact that while the method of taking the predicted value p switches depending on the size relation of the values of the neighboring pixels a, b and c, the same predicted value p can be taken on the decoding side as the encoding side without needing to transmit additional information concerning the switch, since the pixels a, b and c have already been encoded. In order to improve predictive accuracy with JPEG-LS, a technique is used that involves correcting the predicted value p with reference to the mean value of the prediction errors produced up until that point with pixels encoded in state S, although description is omitted here.

The difference e between the predicted value p and the value x of the pixel of interest is derived, and the derived difference e is converted to a non-negative integer and Golomb encoded. At this time, an encoding parameter k is determined according to the context of the pixel of interest.

With JPEG-LS, an occurrence frequency N[S] for every state S, and an absolute sum A[S] of the prediction errors encoded in that state are held. The Golomb encoding parameter k satisfies the following condition using these two values. Note that "x^y" shows x to the power of y.

$2^{(k-1)} < A[S]/N[S] \leq 2^k$

In reality, the division A[S]/N[S] need not be performed. Deriving the smallest k such that $N[S] \times 2^k \geq A[S]$ is adequate. A large value will be thus selected for the k parameter when the absolute mean of the prediction errors is large, while a small k parameter will conversely be selected when the absolute mean of the prediction errors is small.

A[S] and N[S] are set to initial values at the start of encoding, and the probability distribution of each state is dynamically tracked by updating these values as required during the encoding process.

An image processing apparatus using the above JPEG-LS executes processing for determining the k parameter whenever a prediction error is encoded.

While measures such as making division unnecessary are taken to reduce the processing load, performing the processing that accompanies an indefinite number of decisions cannot be said to be efficient from the standpoint of processing load.

A large number of digits (bits) are required to hold the absolute sum of the prediction errors, and the memory capacity for A[S] can at times be problematic.

The encoding parameter k is determined based on the absolute mean of the prediction errors. Thus, the problem remains that when encoding an information source whose statistical nature changes greatly due, for example, to insufficient state separation, the occurrence of a large prediction error will cause an increase in the k parameter for the majority of prediction errors encoded thereinafter, for instance.

SUMMARY OF THE INVENTION

The present invention was made in consideration of the above problem. According to embodiments of the present invention, a technique is provided for easily determining an encoding parameter and realizing excellent encoding performance in the encoding of images using a dynamic probability distribution model.

According to a first aspect of the present invention, there is provided an image encoding apparatus. Namely, an image encoding apparatus comprises input means for inputting a symbol to be encoded; encoding means for encoding the symbol in accordance with an encoding parameter to generate encoded data; judging means for judging whether the symbol exceeds an upper limit of a target range for the encoding parameter, and whether the symbol falls below a lower limit of the target range; and updating means for updating the encoding parameter according to a result of the judgment.

According to a second aspect of the present invention, there is provided a control method of controlling an image encoding apparatus. Namely, a control method of controlling an image encoding apparatus, comprises an input step of inputting a symbol to be encoded; an encoding step of encoding the symbol in accordance with an encoding parameter to generate encoded data; a judging step of judging whether the symbol exceeds an upper limit of a target range for the encoding parameter, and whether the symbol falls below a lower limit of the target range; and an updating step of updating the encoding parameter according to a result of the judgment.

According to a third aspect of the present invention, there is provided an image decoding apparatus. Namely, an image decoding apparatus comprises input means for inputting encoded data; decoding means for decoding the encoded data in accordance with a decoding parameter to generate symbol data; judging means for judging whether the symbol exceeds an upper limit of a target range for the decoding parameter, and whether the symbol falls below a lower limit of the target range; and updating means for updating the decoding parameter according to a result of the judgment.

According to a fourth aspect of the present invention, there is provided a control method of controlling an image decoding apparatus. Namely, a control method of controlling an image decoding apparatus, comprises an input step of inputting encoded data; a decoding step of decoding the encoded data in accordance with a decoding parameter to generate symbol data; a judging step of judging whether the symbol exceeds an upper limit of a target range for the decoding parameter, and whether the symbol falls below a lower limit of the target range; and an updating step of updating the decoding parameter according to a result of the judgment.

According to a fifth aspect of the present invention, there is provided an image encoding apparatus. Namely, an image encoding apparatus that encodes image data based on a dynamic probability distribution model, comprises input means for inputting image data in pixel units; symbol generating means for generating a symbol for entropy encoding from pixel data of interest input by the input means; encoding means for encoding the symbol generated by the symbol generating means in accordance with a given encoding parameter to generate encoded data; judging means for judging whether the encoding parameter used when the symbol is encoded by the encoding means is within a possible range of the encoding parameter at which a codeword of the symbol is within a target code length, exceeds an upper limit of the range, or falls below a lower limit of the range; and updating means for updating the encoding parameter based on a result of the judgment by the judging means.

According to a sixth aspect of the present invention, there is provided a control method for an image encoding apparatus. Namely, a control method for an image encoding apparatus which encodes image data based on a dynamic probability distribution model, comprises an input step of inputting image data in pixel units; a symbol generating step of generating a symbol for entropy encoding from pixel data of interest input in the input step; an encoding step of encoding the symbol generated in the symbol generating step in accordance with a given encoding parameter to generate encoded data; a judging step of judging whether the encoding parameter used when the symbol is encoded in the encoding step is within a possible range of the encoding parameter at which a codeword of the symbol is a target code length, exceeds an upper limit of the range, or falls below a lower limit of the range; and updating the encoding parameter based on a result of the judgment in the judging step.

According to a seventh aspect of the present invention, there is provided an image decoding apparatus. Namely, an image decoding apparatus that decodes encoded image data based on a dynamic probability distribution model, comprises input means for inputting encoded data in pixel units; decoding means for decoding the encoded data input by the input means in accordance with a given decoding parameter to generate a symbol of a pixel of interest; image data restoring means for restoring pixel data of the pixel of interest from the symbol obtained by decoding; judging means for judging whether the decoding parameter used when the symbol is decoded by the decoding means is within a possible range of an encoding parameter at which a codeword of the symbol is within a target code length, exceeds an upper limit of the range, or falls below a lower limit of the range; and updating means for updating the decoding parameter based on a result of the judgment by the judging means.

According to an eighth aspect of the present invention, there is provided a control method for an image decoding apparatus. Namely, a control method for an image decoding apparatus that decodes encoded image data based on a dynamic probability distribution model, comprises an input step of inputting encoded data in pixel units; a decoding step of decoding the encoded data input in the input step in accordance with a given decoding parameter to generate a symbol of a pixel of interest; a restoring step of restoring pixel data of the pixel of interest from the symbol obtained by decoding; a judging step of judging whether the decoding parameter used when the symbol is decoded in the decoding step is within a possible range of an encoding parameter at which a codeword of the symbol is within a target code length, exceeds an upper limit of the range, or falls below a lower limit of the range; and an updating the decoding parameter based on a result of the judgment in the judging step.

According to the present invention, an encoding parameter can be determined using a simple method with little processing load or memory cost, and encoding of image data with excellent compression performance is possible.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows a table for quantizing the difference between neighboring pixels.

FIG. 3 shows the relative positional relation between a pixel x for encoding and neighboring pixels a, b and c.

FIG. 5A is a table showing the relation between Golomb encoding parameters k and the code lengths of symbols.

FIG. 5B is a table showing the relation between Golomb encoding parameters k, the code lengths of symbols, and correction values.

FIG. 6 shows an example of k parameter transition in the image processing apparatus according to the first embodiment.

FIG. 7 shows a probability distribution f(n,1) at which the encoding probability is maximized when k=1.

FIG. 9 shows the configuration of a code stream output from the image processing apparatus.

FIG. 12 shows the association between index values i and parameters k in the third embodiment.

FIG. 16 shows exemplary Golomb encodes.

DESCRIPTION OF THE EMBODIMENTS

The present invention will be described in detail below in accordance with preferred embodiments, with reference to the accompanying drawings.

First Embodiment

Figure 1:
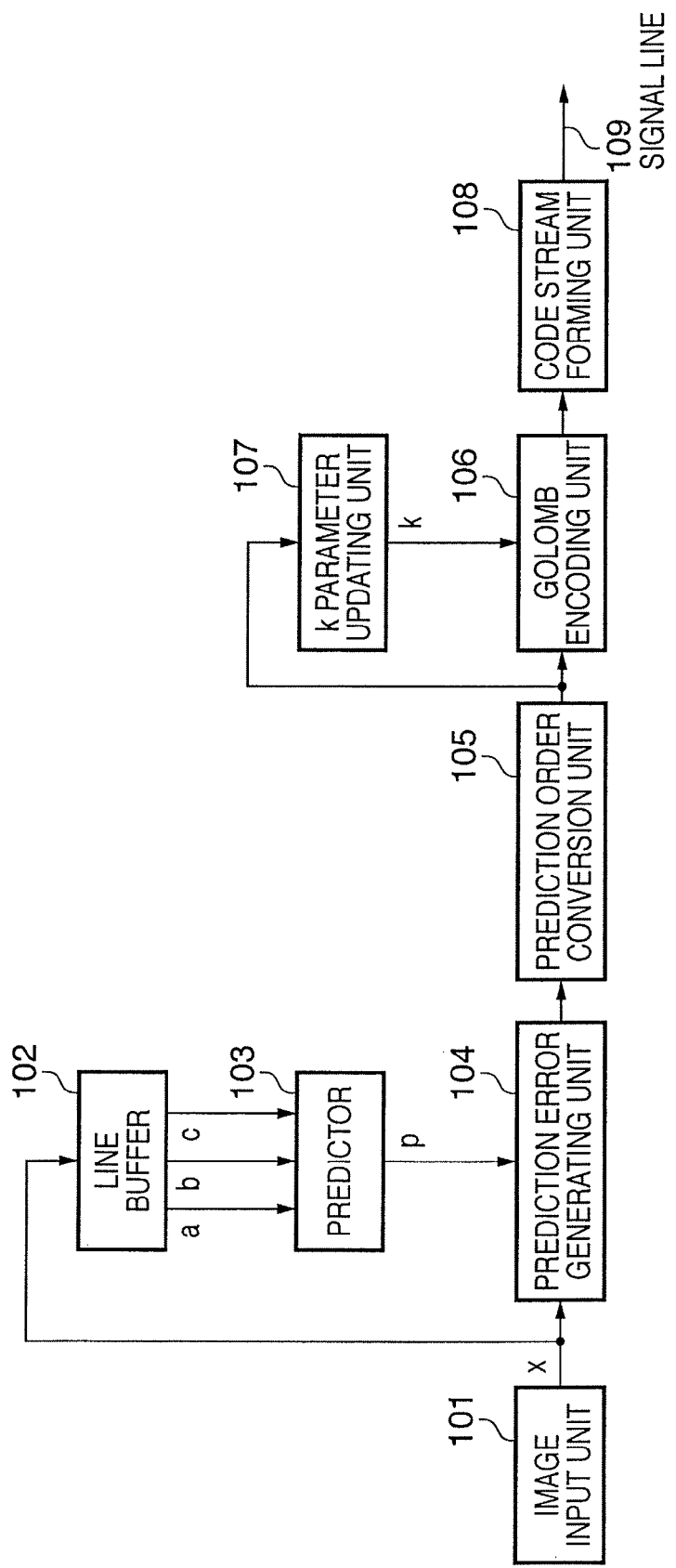
FIG. 1 is a block configuration diagram of an image processing apparatus according to a first embodiment.

FIG. 1 is a block configuration diagram of an image processing apparatus according to a first embodiment.

As shown in FIG. 1, an image processing apparatus that performs image encoding according to the present embodiment includes an image input unit 101, a line buffer 102, a predictor 103, a prediction error generating unit 104, a prediction order conversion unit 105, a Golomb encoding unit 106, a k parameter updating unit 107, and a code stream forming unit 108. The reference numeral 109 in FIG. 1 denotes a signal line.

Image encoding performed by the image processing apparatus according to the present embodiment will be described below with reference to FIG. 1. Here, the image for encoding is assumed to be monochrome image data configured by image data in which the pixels express 8-bit (range of 0-255) luminance values or density values. However, the present system is similarly applicable in relation to color images in which a single pixel is expressed by a plurality of components (colors) such as RGB or CMYK, or image data in which each component is expressed by a bit precision of 8 bits or more. If the system is applied to color images, for example, a color image is separated for every component and encoded similarly to monochrome images. Note that an image for encoding is assumed to be configured horizontally by W pixels and vertically by G pixels.

The operations of the units in the image processing apparatus of the present embodiment will be described next.

The image input unit 101 inputs pixel data x of the image data for encoding. Pixel data is input in raster scan order. The input source is assumed to be an image scanner, although the type of input source is not restricted, and may be a storage medium storing an image data file.

The line buffer 102 has the capacity to store two lines of image data, and sequentially stores image data input from the image input unit 101. That is, the capacity required of the line buffer 102 is 2×W bytes. The two lines worth of image data held in the line buffer 102 is initialized with a prescribed value at the start of encoding. The initial pixel value should be a value that can be mutually set by the encoding apparatus and the decoding apparatus. To simplify description, the line buffer 102 is here assumed to be initialized with "0" when encoding is started.

Figure 3:
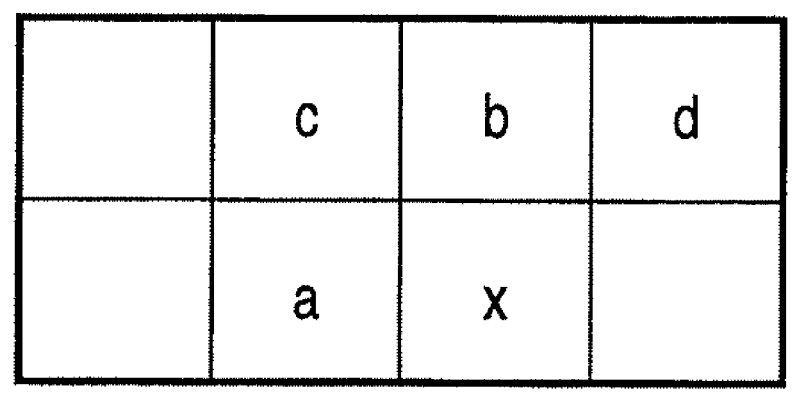

The predictor 103 refers to encoded neighboring pixels a, b and c and generates a predicted value p for the pixel input from the image input unit 101 (hereinafter, "pixel of interest") The positional relation between the pixel of interest x and the neighboring pixels a, b and c is as shown in FIG. 3. The encoded neighboring pixels a, b and c are supplied from the line buffer 102. Note that if the pixel of interest x is at the front or end of a line, at least one of neighboring pixels a, b and c will be outside the range of the image for encoding. Mutual values are used by the encoding apparatus and the decoding apparatus, and in such cases, the value outside the range of the image is here assumed to be zero. In the present embodiment, the predicted value p is derived using the following equation.

$p = \min(a,b)$ (if $\max(a,b) \leq c$) or $p = \max(a,b)$ (if $\min(a,b) \geq c$) or $p = a+b-c$ (none of the above)

Note that it is possible to use various methods other than the above method to generate predicted values. Different prediction equations may be used, such as the seven prediction equations available for use with the lossless encoding of the standard JPEG system, for example. A method can also be used that involves enhancing predictive accuracy by correcting the predicted value p using prediction error values that normally occur with encoded pixels, as with the standard JPEG-LS system.

The prediction error generating unit 104 computes the difference "x−p" between the predicted value p generated by the predictor 103 and the value x of the pixel of interest input from the image input unit 101, and outputs the result as a prediction error e.

The prediction order conversion unit 105 maps the prediction errors e derived by the prediction error generating unit 104 to non-negative integer values M(e) using the following equation. Hereinafter, M(e) is called the prediction order.

$$M(e)=2\times e \text{ (if } e \geqq 0)$$

$$M(e)=-2\times e-1 \text{ (if } e<0)$$

As a result, M(e) is a non-negative integer, and the plus/minus sign of the prediction error e can be identified depending on whether M(e) is odd or even.

The Golomb encoding unit 106 Golomb encodes the prediction order M(e) output from the prediction order conversion unit 105 using the k parameter held in the k parameter updating unit 107, and outputs a binary symbol stream.

Golomb encoding is characterized by enabling encoding using a plurality of probability models that differ depending on a parameter variable m, with a non-negative integer value set as the encoding target. Golomb encoding is also advantageous in that a code table is not required since codewords can be derived from the symbol for encoding and the parameter variable m. The following description is limited to a special form of Golomb encoding in which the parameter variable m equal $2^k$, with k as the parameter variable. A form of Golomb encoding is adopted as a prediction error coding method in JPEG-LS (ISO/IEC 14495-1|ITU-T Recommendation T.87), recommended as an international standard by ISO and ITU-T.

The procedure for Golomb encoding a non-negative integer value n of the encoding target with the encoding parameter k is as follows. Firstly, n is right shifted k bits to derive an integer value u. In simple terms, the integer value u signifies the quotient of dividing n by $2^k$.

The code for the symbol n is configured by the combination of "1" following u number of "0"s (valuable length portion) and the lower order k bits of n (fixed length portion). Exemplary Golomb encodes for k=0, 1, 2 and 3 are shown in FIG. 16.

When symbol n=5 at k=2 (hence, m=4), for example, the variable length portion is binary "01"since u=floor(5/4)=1. Since the lower order 2 bits of the symbol n are "01", the Golomb encodeword for the symbol "5" when k=2 is "0101", with a code length of 4 bits.

Note that the method of configuring code mentioned here is by way of example, and that uniquely decodable code can be configured even when the order of the fixed length portion and the variable length portion is reversed. Code can also be configured by reversing the 0's and 1's.

The k parameter updating unit 107 updates the k parameter held therein, after the prediction order M(e) output from the prediction order conversion unit 105 has been encoded by the Golomb encoding unit 106. Updating is performed by comparing the value of the encoded prediction order M(e) with the range obtainable by the smallest code length with the current k parameter (hereinafter, "optimal symbol range"), and adding or subtracting one from the value of k if necessary.

FIG. 5A is a table showing the code lengths of Golomb encodes in two dimensional space, with symbol values (vertical axis) and k parameters (horizontal axis). The table shows code lengths (bit numbers) that occur when symbols from 0 to 28 (corresponding to the prediction order M(e)) are encoded by respective encoding parameters k=0 to 5.

The table is shown divided into three areas. The first area is area 50, which focuses on individual symbols and contains the smallest (shortest) code lengths of the codewords for respective symbols. The remaining two areas are areas 51 and 52 separated by area 50. Area 51 can be restated as being an area defined by encoding parameters k that are larger than the values of respective encoding parameters k defining area 50, and by code lengths that are not the smallest code length. Area 52 can be restated as being an area defined by encoding parameters k that are smaller than the value of respective encoding parameters k defining area 50, and by code lengths that are not the smallest code length.

Taking the symbol "8" as an example, the smallest code length "5" is in the range of encoding parameter k=2 to 4. Consequently, with the symbol "8", the code length "5" for the range of encoding parameter k=2 to 4 is positioned within area 50.

Again, taking the symbol "8" as an example, the code length at encoding parameter k=5 is "6", which is greater than the smallest code length "5". Hence, with the symbol "8", the code length "6" for encoding parameter k=5 is positioned within area 51.

Similarly, taking the symbol "8" as an example, the code length at encoding parameter k=0 or 1 is "9" or "6", which is of course greater than the smallest code length "5". Hence, with the symbol "8", the code length "9" or "6" for encoding parameter k=0 or 1 is positioned within area 52.

If the prediction order M(e) for encoding was within area 51, the k parameter updating unit 107 of the present embodiment judges that a smaller k parameter is appropriate when encoding the next pixel, and corrects the value of k to a smaller value. Specifically, one is subtracted from the parameter k in preparation for encoding the next pixel.

Again, if the encoded prediction order M(e) were within area 52, it would be judged that a larger k parameter is appropriate and the value of k is corrected to a larger value. Specifically, k is updated by adding "1" thereto.

If the encoded prediction order M(e) were within area 50, it would be judged that the current k parameter is appropriate, and the value of k is maintained without correction.

Note that the boundaries of areas 51 and 52 shown in FIG. 5A can be derived from the parameter k. Area 51 is a range that satisfies the relation "n<$2^{(k-1)}$", while area 52 is a range that satisfies "$3\times 2^k \leqq n$", where n expresses the value of the symbol for encoding. In other words, only the information defining area 50 need be stored, without it being necessary to store the entire table of FIG. 5A. With area 50, it is adequate to store, for each symbol, the value of the symbol and the upper and lower limits of the parameter k at the smallest code length for when the symbol is encoded.

To render this judgment unnecessary, the k parameter updating unit 107 may prestore a table such as that shown in FIG. 5B. The table of FIG. 5B adds the item "correction value" (−1, 0, 1) to the table of FIG. 5A in readiness for the next encoding. The correction value within area 50 is "0", the correction value within area 51 is "−1", and the correction value within area 52 is "+1". Consequently, since the correction value H (=−1, 0, +1) can be expressed as H(n,k), the k parameter may be updated by supplementing the value H(n,k) to the current k parameter.

The code stream forming unit 108 concatenates code streams (binary symbol streams) output from the Golomb encoding unit 106, supplements required additional information to form encoded data that constitutes the output of the image processing apparatus, and outputs the encoded data via the signal line 109. If the output destination is a storage apparatus, the encoded data is stored as a file.

FIG. 9 shows the configuration of a code stream output from the image processing apparatus. Information necessary for decoding the image, for example, attribute information showing the horizontal pixel number, the vertical pixel number and the color space of the image, and additional information such as the component number and the bit number of each component, is appended as a header at the start of the output code stream.

Figure 4:
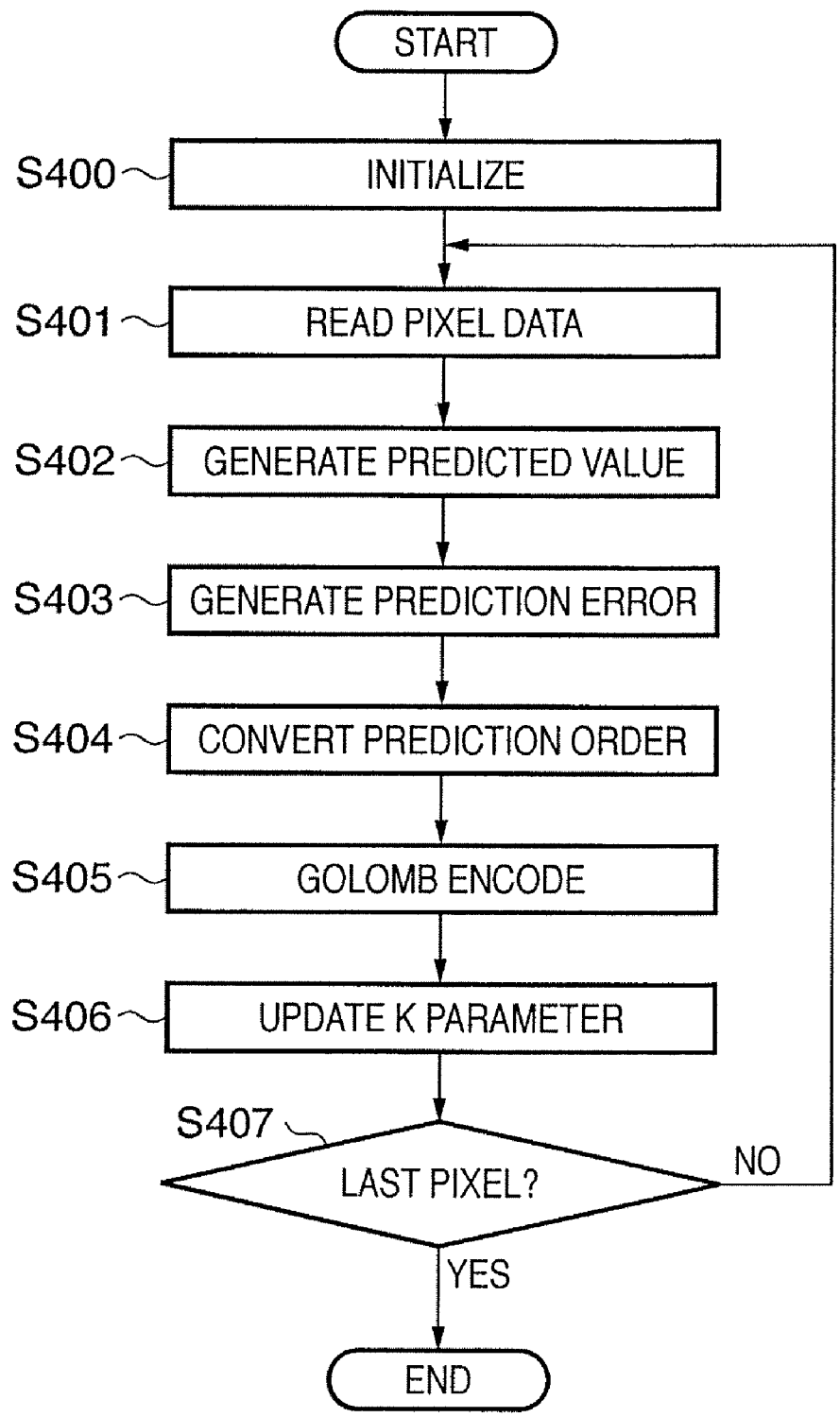
FIG. 4 is a flowchart showing the flow of encoding according the first embodiment.

FIG. 4 is a flowchart showing the flow of the encoding of image data by the image processing apparatus according to the present embodiment. The entire flow of image encoding performed by the image processing apparatus according to the present embodiment will be described below with reference to the flowchart shown in FIG. 4.

Firstly, the image data stored in the line buffer 102 and the encoding parameter k held in the k parameter updating unit 107 are initialized prior to the encoding. With the present embodiment, image data in the line buffer 102 is all initialized to zero, and the k parameter held by the k parameter updating unit 107 is set to "2" (step S400). The image input unit 101 then starts inputting image data in raster scan order, and the input image data is stored in the line buffer 102 as well as being supplied to the prediction error generating unit 104 (step S401).

Next, the pixels a, b and c neighboring the pixel of interest are read from the line buffer 102, and a predicted value p is generated by the predictor 103 (step S402). The prediction error generating unit 104 derives the difference between the pixel of interest x and the predicted value p generated by the predictor 103, and outputs the derived difference as prediction error e (step S403). The prediction order conversion unit 105 converts the prediction error e to a prediction order M(e) (step S404). The Golomb encoding unit 106 Golomb encodes the prediction order M(e) using the k parameter held in the k parameter updating unit 107 (step S405).

The k parameter updating unit 107 then compares the encoded prediction order M(e) with the optimal range of the k parameter prior to updating, and updates the current k parameter stored therein if necessary (step S406). That is, the k parameter updating unit 107 judges which of areas 50 to 52 shown in FIG. 5A or 5B the position shown by the prediction order M(e) and the k parameter used by the Golomb encoding unit 106 is within, and updates (corrects) the k parameter for use when encoding the next pixel based on whichever area the position is judged to be in.

Next, it is judged whether the encoded pixel is the last pixel of the image (step S407). If so, the encoding is ended, and if not, processing moves to step S401, and the next pixel is encoded.

The entire image is encoded as a result of the above processing. Note that encoding does not necessarily need to be performed in this order. For example, the order described here involves image data being read (step S401) and a predicted value being generated (step S402), but the order may be reversed. Also, provided the pre-update k parameter can be correctly delivered, the order of the Golomb encoding (step S405) and the updating of the k parameter (step S406) may be changed, or this processing may be performed in parallel.

Here, taking the encoding of a stream "0, 0, 2, 0, 0, 1, 0, 3, 0, . . . " of prediction orders output in order from the prediction order conversion unit 105 as an example, the value of the k parameter used in encoding, the details of the updating, and the transition of the k value after updating are shown in FIG. 6.

The changes in the k parameter will be described below in order. The initial value of the k parameter is set to "2" at the start of encoding, and the first symbol "0" is Golomb encoded using k=2. The symbol "0" for k=2 corresponds to area 51 of FIG. 5A. Consequently, one is subtracted from k to update to k=1.

The second symbol "0" is encoded with the updated k (here, k=1) In this case, one is subtracted from k to update to k=0, since the symbol "0" similarly corresponds to area 51 of FIG. 5A.

Next, the symbol "2" is encoded with k=0. Since the symbol "2" is in the optimal symbol range for k=0, the value of k is not changed. The symbol stream "0, 0, 1, 0" is thereafter similarly encoded, with the value of k remaining unchanged for the same reason.

The symbol "3" is then encoded using k=0, with one being added to update to k=1 since this symbol corresponds to area 52. The following symbol "0" is encoded using k=1, with one being subtracted to update to k=0 since this symbol corresponds to area 51. Symbols are thereby encoded and the parameter k is updated. The fact that the k parameter changes with the localized nature of the symbol for encoding is also evident from this example.

To decode encoded data generated by the image processing apparatus of the present embodiment, respective pixels can be decoded using the reverse procedure to the encoding, with reference to the additional information shown in the header. In decoding the symbols, the Golomb encoding parameter k at this time takes the same values on the decoding side as the encoding side. Namely, decoding is also started by providing the same initial value on the decoding side as the encoding side, and then after determining whether the decoded symbol is in the optimal symbol range for the current k parameter, the value of k can be updated if necessary with the same algorism as for the encoding.

Figure 15:
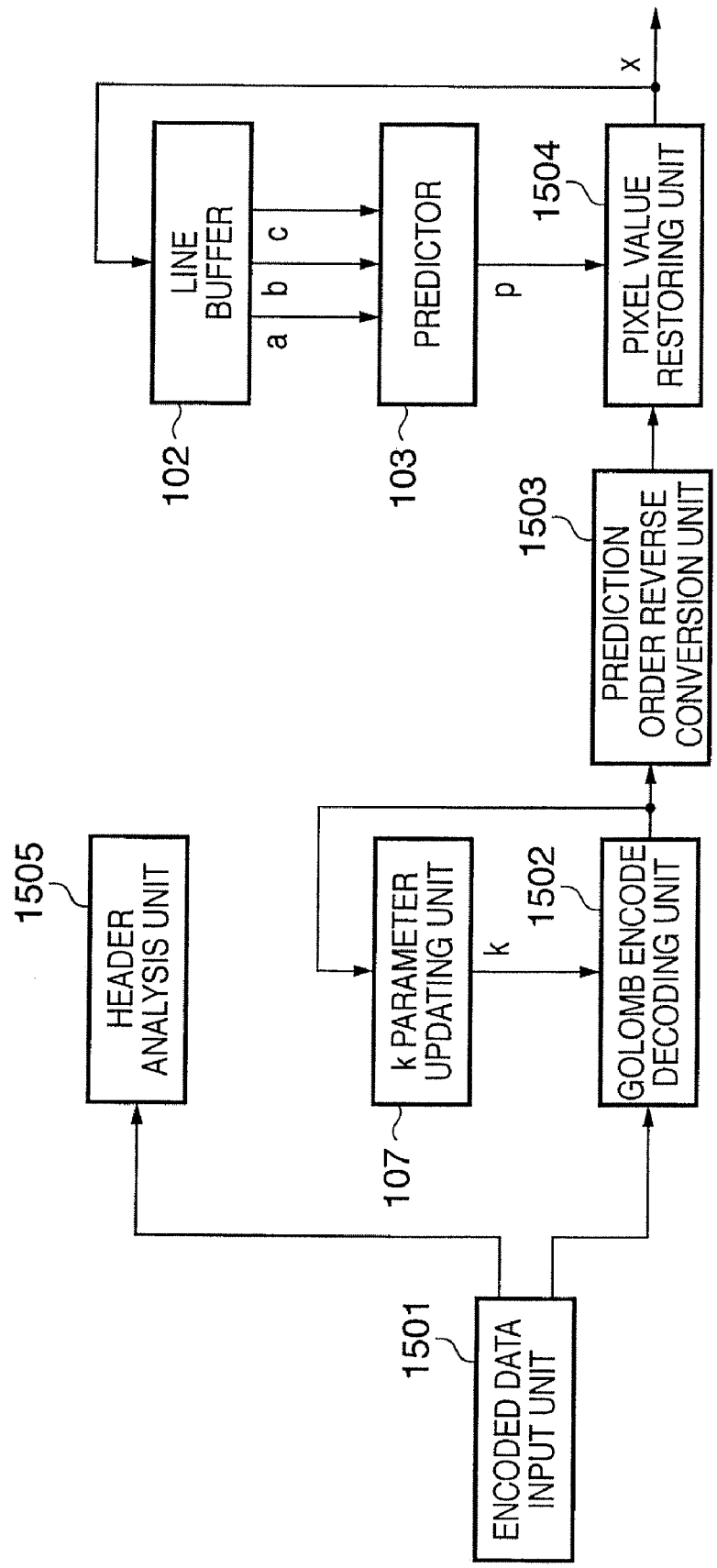
FIG. 15 is a block configuration diagram of an image processing apparatus that performs decoding in the first embodiment.

FIG. 15 is a block diagram showing the functional configuration of an image processing apparatus on the decoding side. The same numbers are appended to blocks that are common to FIG. 1 described previously, and a description of these blocks is omitted. As shown in FIG. 15, the image processing apparatus on the decoding side includes an encoded data input unit 1501, a Golomb encode decoding unit 1502, a prediction order reverse conversion unit 1503, a pixel value restoring unit 1504, a header analysis unit 1505, the line buffer 102, the predictor 103, and the k parameter updating unit 107.

The operations of the various processing units in the image processing apparatus that performs decoding are described below.

The encoded data input unit 1501 inputs encoded data for decoding. At this time, the encoded data input unit 1501 analyses the structure of the encoded data, passing the header portion to the header analysis unit 1505 and the encoded pixel data to the Golomb encode decoding unit 1502.

The header analysis unit 1505 analyses the header sent from the encoded data input unit 1501, and removes information required in the decoding, such as the horizontal and vertical pixel numbers of the encoded image data, which is then reflected in the controls on the image processing apparatus.

The Golomb encode decoding unit 1502 acquires the k parameter held in the k parameter updating unit 107, and uses this information to restore as far as the prediction order M(e).

The k parameter updating unit 107 updates the k parameter based on the restored prediction order M(e) if necessary, using the same method as the updating at the time of the encoding mentioned previously.

The prediction order reverse conversion unit 1503 restores the prediction error e using the following equation, based on the prediction order M(e) restored by the Golomb encode decoding unit 1502.

$$e = M(e)/2 \text{ (if } M(e) \text{ is even)}$$

$$e = -(M(e)+1)/2 \text{ (if } M(e) \text{ is odd)}$$

The pixel value restoring unit 1504 decodes and outputs the value x of the pixel of interest using e+p, based on the prediction error e restored by the prediction order reverse conversion unit 1503 and the predicted value p generated by the predictor 103. The decoded pixel value x is stored in the line buffer 102, and used when generating the predicted value of pixels thereafter.

Image data is decoded from encoded data as a result of the Golomb encode decoding unit 1502 to the pixel value restoring unit 1504 repeatedly performing processing until all of the pixels configuring the image have been decoded.

As described above, the image processing apparatus according to the present embodiment performs a control to determine whether an encoded symbol or a decoded symbol is in the optimal symbol range for the current k parameter, and updates the value of k by adding or subtracting one if not within the optimal symbol range, to thereby obtain an appropriate k parameter. Thus, even with image data whose statistical nature differs locally, efficient encoding can be performed in which changes in the nature of the image data are tracked.

Modification of First Embodiment

The above embodiment may be realized by a general-purpose information processing apparatus such as a personal computer and a computer program executed on the information processing apparatus.

Figure 14:
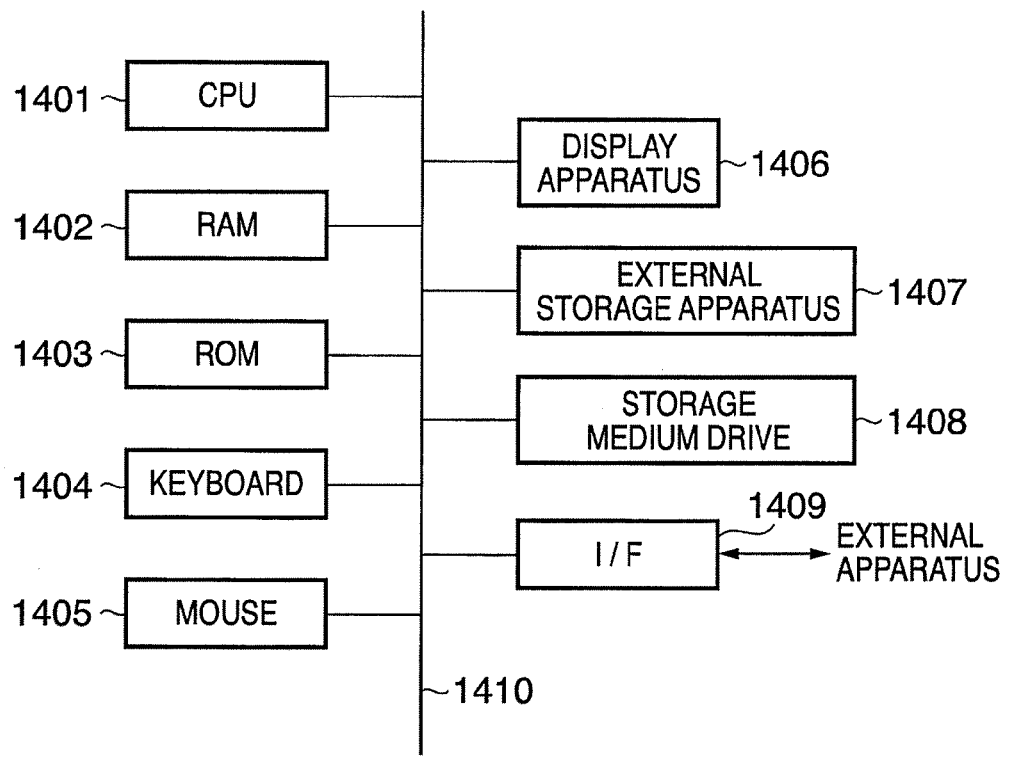
FIG. 14 is a block configuration diagram of an information processing apparatus in the case where the first to third embodiments are realized by software.

FIG. 14 shows the basic configuration of an information processing apparatus according to the present modification. In FIG. 14, the reference numeral 1401 denotes a CPU that executes image encoding (described later), along with controlling the entire apparatus using data and programs stored in a RAM 1402 or a ROM 1403.

The reference numeral 1402 denotes a RAM that includes an area for storing programs and data downloaded from an external apparatus via an external storage apparatus 1407, a storage medium drive 1408, or an I/F 1409, and also a work area used when the CPU 1401 is executing various processing.

The reference numeral 1403 denotes a ROM for storing boot programs, initialization programs for setting the information processing apparatus, and data.

The reference numerals 1404 and 1405 respectively denote a keyboard and a pointing device such as a mouse which are able to input various instructions to the CPU 1401.

The reference numeral 1406 denotes a display device configured by a CRT, an LCD or the like, and able to display information such as images and text.

The reference numeral 1407 denotes an external storage apparatus that is a large-capacity information storage apparatus such as a hard disk drive or the like storing the operating system (OS), application programs for image encoding and decoding (described later), image data for encoding, or the like. The OS and applications are executed by being loaded into a prescribed area on the RAM 1402 under the control of the CPU 1401.

The reference numeral 1408 denotes a storage medium drive that reads programs or data recorded on a storage medium such as a CD-ROM or a DVD-ROM, and outputs the read programs or data to the RAM 1402 or the external storage apparatus 1407. Note that programs for performing image encoding (described later) or images for encoding may be recorded on the storage medium, in which case the storage medium drive 1408 loads the programs or data into a prescribed area on the RAM 1402 under the control of the CPU 1401.

The reference numeral 1409 denotes an interface (I/F) that connects external apparatuses to the information processing apparatus, and makes data communication possible between the information processing apparatus and external apparatuses. For example, image data to be encoded can be input to the RAM 1402 of the information processing apparatus or the external storage apparatus 1407 via the I/F 1409, or conversely, encoded image data generated by the RAM 1402 of the information processing apparatus or the external storage apparatus 1407 can be output to the outside of the information processing apparatus via the I/F 1409. The reference numeral 1410 denotes a bus linking the units.

When encoding an image, the corresponding program is loaded into the RAM 1402 from the external storage apparatus 1407, and the CPU 1401 executes the processing. The encoding program can basically perform processing in accordance with the flowchart of FIG. 4. It should also be possible to configure this program with modules (otherwise referred to as functions, subroutines) equating to the configurations shown in FIG. 1. The line buffer 102 will, however, need to secure a data area of this capacity in the RAM 1402.

It should be clear that the program relating to the decoding can also be configured with the modules shown in FIG. 15.

Second Embodiment

Next, a second embodiment will be described below. The image processing apparatus of the first embodiment corrects the encoding parameter k by increasing or decreasing the value of k whenever the symbol for encoding is outside the optimal symbol range.

While this offers the advantage of being able respond quickly to changes in the statistical nature of the information source, stability becomes a problem with an information source that exhibits little change.

Consider, for example, that the probability distribution $f(n,k)=(1/2)^{\wedge}(n,k)$, this being the probability distribution at which encoding efficiency is maximized for respective k parameters. $L(n,k)$ is the code length when the symbol n for encoding is Golomb encoded with the encoding parameter k, and is given by $L(n,k)=k+1+floor(n/(2^{\wedge}k))$. Note that $x^{\wedge}y$ expresses x to the power of y, and that $floor(x)$ expresses a function which returns the maximum integer that does not exceed x.

FIG. 7 illustrates the probability distribution $f(n,1)$ when $k=1$.

When the probability that one of the symbols belonging to area 52 shown in FIG. 5A will appear, namely, the sum of appearance probabilities for symbols belonging to area 52 for a given value of k is investigated in relation to the probability distribution $f(n,k)$, a probability of 12.5% is revealed for any value of k.

When similarly viewed in relation to area 51, the appearance probability of symbols in area 51 is 25%, excluding $k=0$. Namely, this implies that the k parameter changes at a probability of 37.5% (12.5%+25%), even when the information source with the ideal probability distribution $f(n,k)$ is encoded with a given k parameter ($k \neq 0$).

Figure 8A:
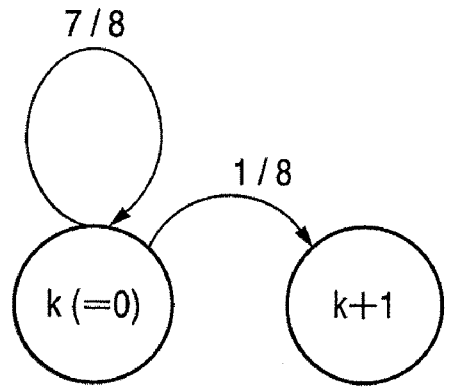
FIGS. 8A and 8B show transition probabilities for the k parameter.
Figure 8B:
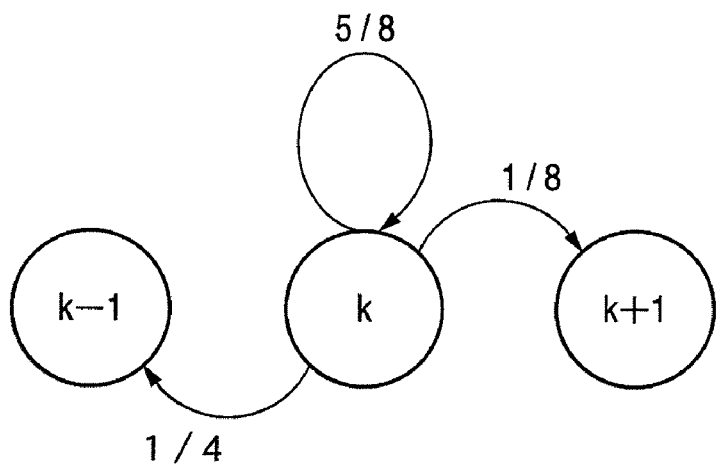

FIGS. 8A and 8B show, for $k=0$ and $k>0$, respectively, the transition of the k parameter that occurs after encoding a symbol of the information source with the distribution probability $f(n,k)$.

A method that involves controlling the fluctuation of the k parameter to improve stability is described here as the second embodiment of the present invention.

Figure 10:
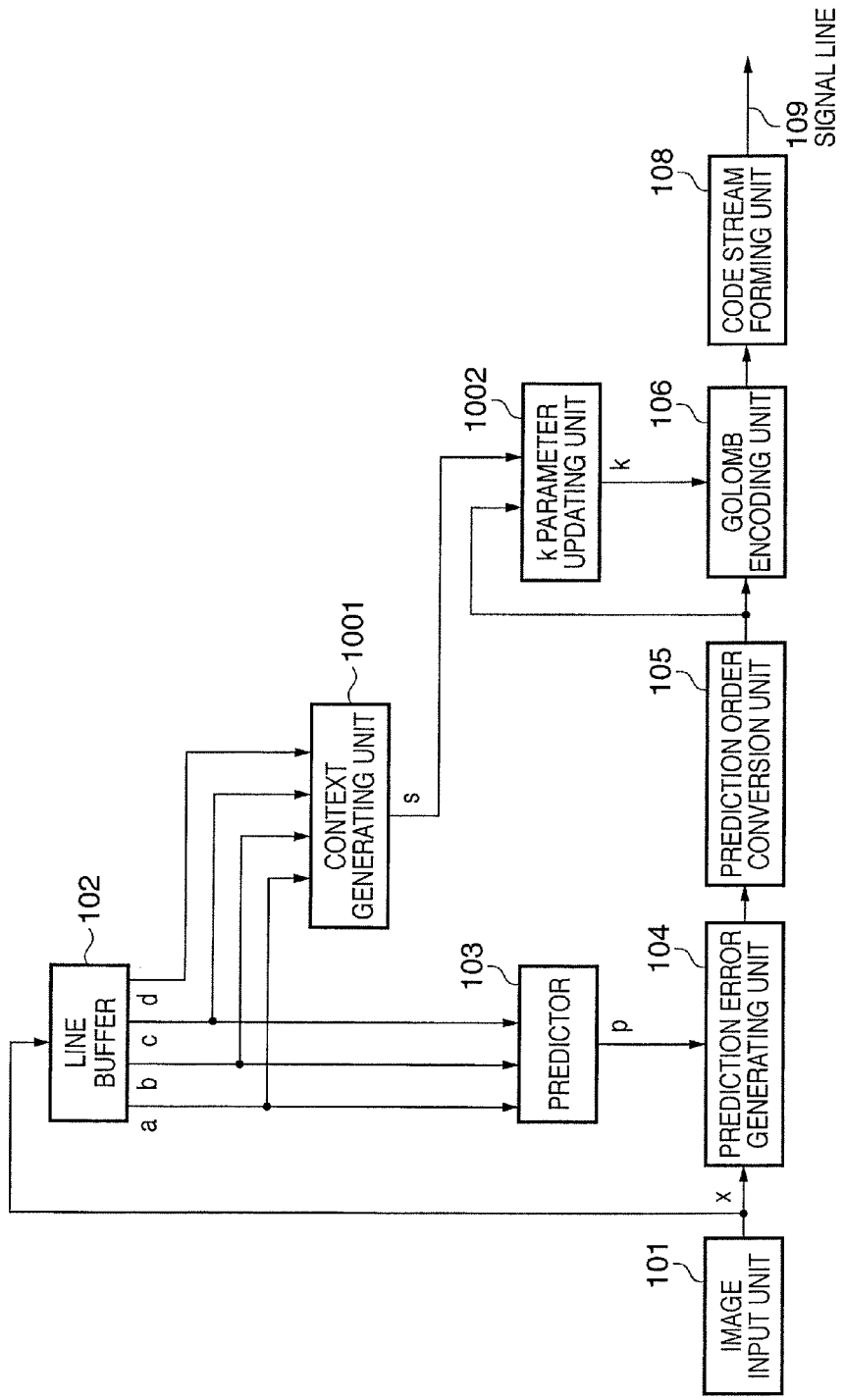
FIG. 10 is a block configuration diagram of an image processing apparatus according to second and third embodiments.

FIG. 10 is a block diagram showing a functional configuration of an image processing apparatus according to the second embodiment. The same numbers are appended to blocks that are common to FIG. 1 described in the first embodiment, and description of these blocks is omitted.

The image processing apparatus according to the second embodiment includes the image input unit 101, the line buffer 102, the predictor 103, the prediction error generating unit 104, the prediction order conversion unit 105, the Golomb encoding unit 106, a context generating unit 1001, a k parameter updating unit 1002, and the code stream forming unit 108. The reference numeral 109 in FIG. 10 denotes a signal line.

Note that with the basic configuration of the image processing apparatus according to the second embodiment, the respective functions may be configured using dedicated hardware. Also, similarly to the modification of the first embodiment described previously, the present embodiment may be configured as shown in FIG. 14, and realized by a computer program that causes the functions of the units shown in FIG. 10 to be realized on a computer. The latter case involves the program being loaded into the RAM 1402 from an external apparatus via the external storage apparatus 1407, the storage medium drive 1408 or the I/F 1409, and executed by the CPU 1401.

Operations performed by the image processing apparatus according to the second embodiment will be described below using FIG. 10.

Image data for encoding by the image processing apparatus according to the second embodiment is described as monochrome image data expressing luminance values in a range of 0 to 255 with 8-bit pixels, similar to the first embodiment. The present embodiment is, however, also applicable in relation to image data configured by a plurality of components, such as with RGB or CMYK color images. Also, the image data for encoding is assumed to be configured by pixel values arranged in raster scan order. An image is assumed to be configured horizontally by W pixels and vertically by H pixels.

With the image processing apparatus according to the second embodiment, the image input unit 101 inputs image data x for encoding, and stores the image data x in the line buffer 102, similarly to the image processing apparatus of the first embodiment. A non-negative integer value M(e) for entropy encoding is generated by the predictor 103, the prediction error generating unit 104, and the prediction order conversion unit 105 described previously.

On the other hand, the context generating unit 1001 reads the pixels a, b, c and d neighboring the pixel of interest x from the line buffer 102, and generates a context expressing the state around the pixel of interest. In the present embodiment, the state numbers S are assumed to be separated into 729 states from 0 to 728 using a method similar to JPEG-LS.

As mentioned in the Description of the Related Art, quantizing the differences between neighboring pixels a and b, b and c, c and d in accordance with the table in FIG. 2 gives Q1, Q2 and Q3. A state number S is generated that uniquely expresses this combination. In the second embodiment, the state number S is determined using the following equation.

$$S = 81 \times Q1 + 9 \times Q2 + Q3 + 364$$

Note that the state (Q1, Q2, Q3) and the state (−Q1, −Q2, −Q3) may be integrated so that the number of states can be reduced to 365, similarly to JPEG-JS, and that contexts may be generated with reference to neighboring pixels other than a, b, c and d.

An array K[S] that stores a k parameter for each state S, and a flag array F[S] referenced in the updating (described below) are held in the k parameter updating unit 1002. At the start of encoding, the array K[S] (S=0, 1, 2, . . . ) is set to an initial value (two in the present embodiment), and the flag array F[S] (S=0, 1, 2, . . . ) is initialized to "0".

Figure 11:
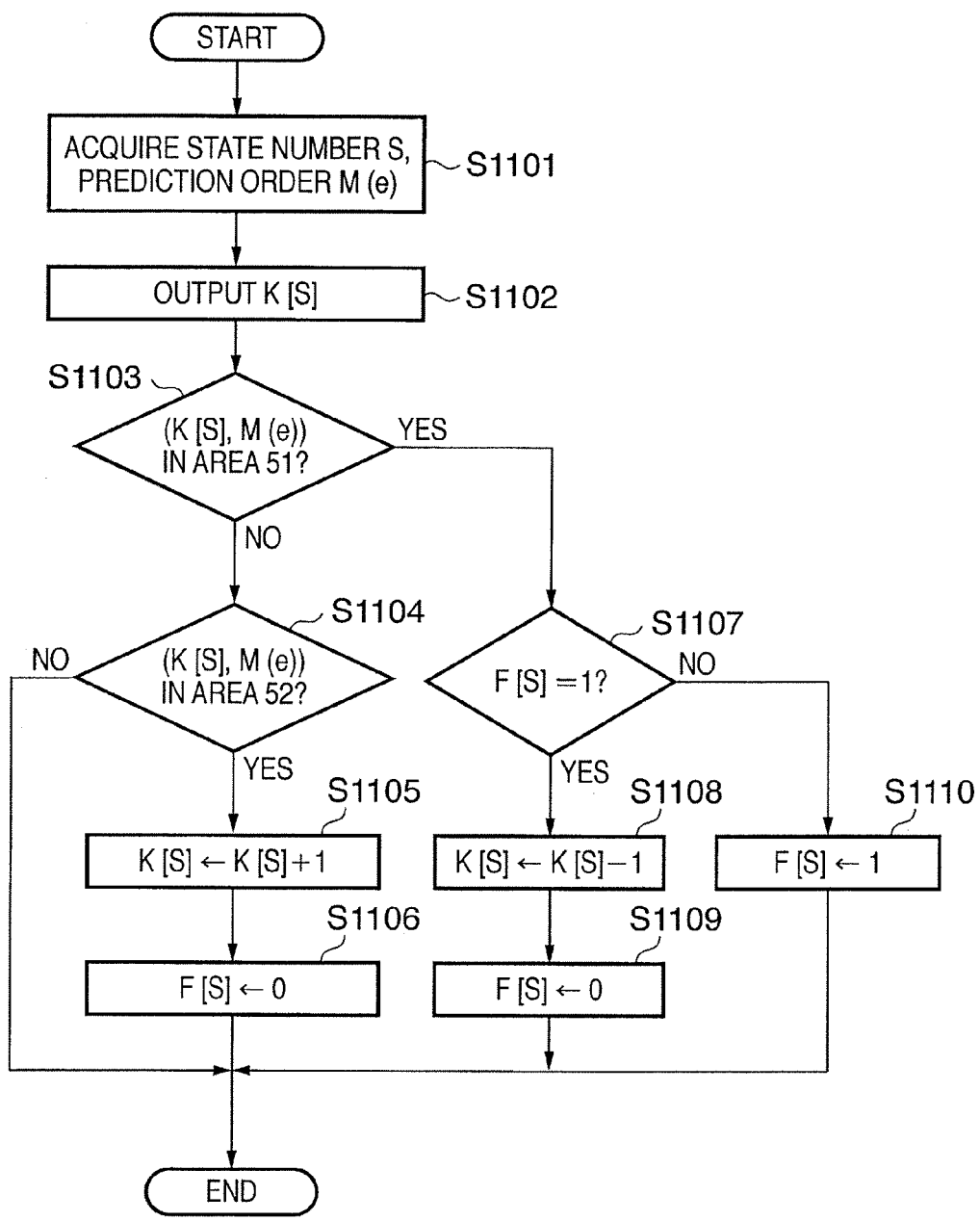
FIG. 11 is a flowchart showing the flow of processing by a k parameter updating unit 1002 in the second embodiment.

FIG. 11 is a flowchart showing the flow of processing by the k parameter updating unit 1002 when encoding the pixel of interest x. The flow of processing by the k parameter updating unit 1002 performed with each pixel will be described using FIG. 11.

Firstly, the k parameter updating unit 1002 acquires the state number S output from the context generating unit 1001 and the prediction order M(e) output from the prediction order conversion unit 105 (step S1101). Next, the k parameter updating unit 1002 acquires the k parameter corresponding to the input state number S using the array element K[S], and outputs the acquired k parameter to the Golomb encoding unit 106 (step S1102). The Golomb encoding unit 106 thereby encodes the prediction order M(e).

Next, the k parameter updating unit 1002 judges whether the position (K[S], M(e)) shown by the value of the current k parameter, namely, K[S], and the prediction order M(e), which is the symbol, is within area 51 (step S1103).

This can also be restated as judging whether the value of the current k parameter exceeds the upper limit of the k parameter at which the code length of the prediction order M(e) is smallest.

If it is judged that the position (K[S], M(e)) is within area 51, processing proceeds to step S1107, where it is determined whether the flag array element F[S] is "1". If it is determined not to be "1", the flag array element F[S] is set to "1" (step S1110). If it is determined in step S1107 that the element F[S] of the flag array is "1", K[S] is updated by subtracting "1" therefrom (step S1108), and the flag array element F[S] is set to "0" (step S1109).

On the other hand, if it is judged in step S1103 that the position (K[S], M(e)) does not belong to area 51, the processing proceeds to step S1104, where it is determined whether the position (K[S], M(e)) is within area 52.

This can also be restated as judging whether the value of the current k parameter falls below the lower limit of the k parameter at which the code length of prediction order M(e) is smallest.

If it is determined that the position (K[S], M(e)) is within area 52, K[S] is updated by adding "1" thereto, and F[S] is set to "0" (step S1106).

If it is determined in step S1104 that the position (K[S], M(e)) does not belong to area 52, namely, if it is determined that the position (K[S], M(e)) is within area 50, it is determined that the current encoding state is within the optical symbol range, and the k parameter is not updated.

Thereinafter, the updated K[S] is applied in encoding pixels subsequent to the pixel of interest that have the same state number S.

To summarize, in the second embodiment, if the position (K[S], M(e)) is within area 52, the k parameter is immediately updated by adding "1" thereto, similarly to the first embodiment. However, if the position (K[S], M(e)) is within area 51, the frequency of processing to update K[S] by subtracting one therefrom is reduced by half using the flag F[S].

Here, consider once again the case where the information source of the probability distribution f(n,k) mentioned at the beginning of the description of the present embodiment is encoded with a given k parameter. In the present embodiment, the probability of updating to increase k is considered to be 12.5%, while the probability of updating to decrease k is considered to be 12.5% or less, so the probability of no transition of the k parameter being performed improves to 75% of more.

Consequently, probability bias in the increasing or decreasing direction when updating the k parameter can be mitigated, and the occurrence probability of unnecessary k parameter fluctuation can be reduced.

Similarly to the first embodiment, prediction orders M(e) are encoded by the Golomb encoding unit 106 using k parameters output from the k parameter updating unit 107, and concatenated by the code stream forming unit 108 as code streams with respect to image data for encoding. The last code stream generated by the code stream forming unit 108 is output externally via the signal line 109.

The flow of image data encoding by the image processing apparatus according to the second embodiment involves only a slight change to the flowchart for the image processing apparatus of the first embodiment shown in FIG. 4. Specifically, context generation by the context generating unit 1001 is performed sometime during the processing of steps S401 to S404. For examples context generation may be implemented between the reading of the pixel data of interest in step S401 and the generation of the predicted value in step S402.

To decode encoded data generated by the image processing apparatus of the second embodiment, respective pixels can be decoded using the reverse procedure to the encoding, with reference to the additional information shown in the header.

In decoding the symbols, the Golomb encoding parameter k at this time takes the same values on the decoding side as the encoding side.

Namely, decoding is also started by providing the same initial value on the decoding side as the encoding side, and then after determining whether the decoded symbol is in the optimal symbol range for the current k parameter, the value of k can be updated if necessary with the same algorism as for the encoding.

As described above, the image processing apparatus according to the second embodiment is able to perform encoding in which the nature of the information source is tracked using a simple method. Moreover, by adjusting the frequency of parameter transition, needless parameter transition can be reduced with respect to an information source that exhibits little change in statistical nature.

Third Embodiment

In the second embodiment, a method was shown in which the k parameter is reduced if symbols occur twice in area 51, although the number of times that updating is implemented may be changed depending on the k parameter. An example of this is described as the third embodiment.

The block diagram of an image processing apparatus of the third embodiment is the same as FIG. 10 described in the second embodiment, the only difference being the processing by the k parameter updating unit 1002. The processing by the k parameter updating unit 1002 in the third embodiment is described below.

The k parameter updating unit 1002 of the third embodiment holds a correspondence table that associates index values i with parameters k as shown in FIG. 12, and an array I[S] storing index values i for 365 state numbers S classified by the context generating unit 1001. All elements of the array I[S] are set to an initial value (here, "4") at the start of encoding. That is, the initial state of the parameter k is "2" whatever the state number S. Put simply, the k parameter based on the index i expressed as an array K[i] can be notated as K[i]=K[I[S]].

Figure 13:
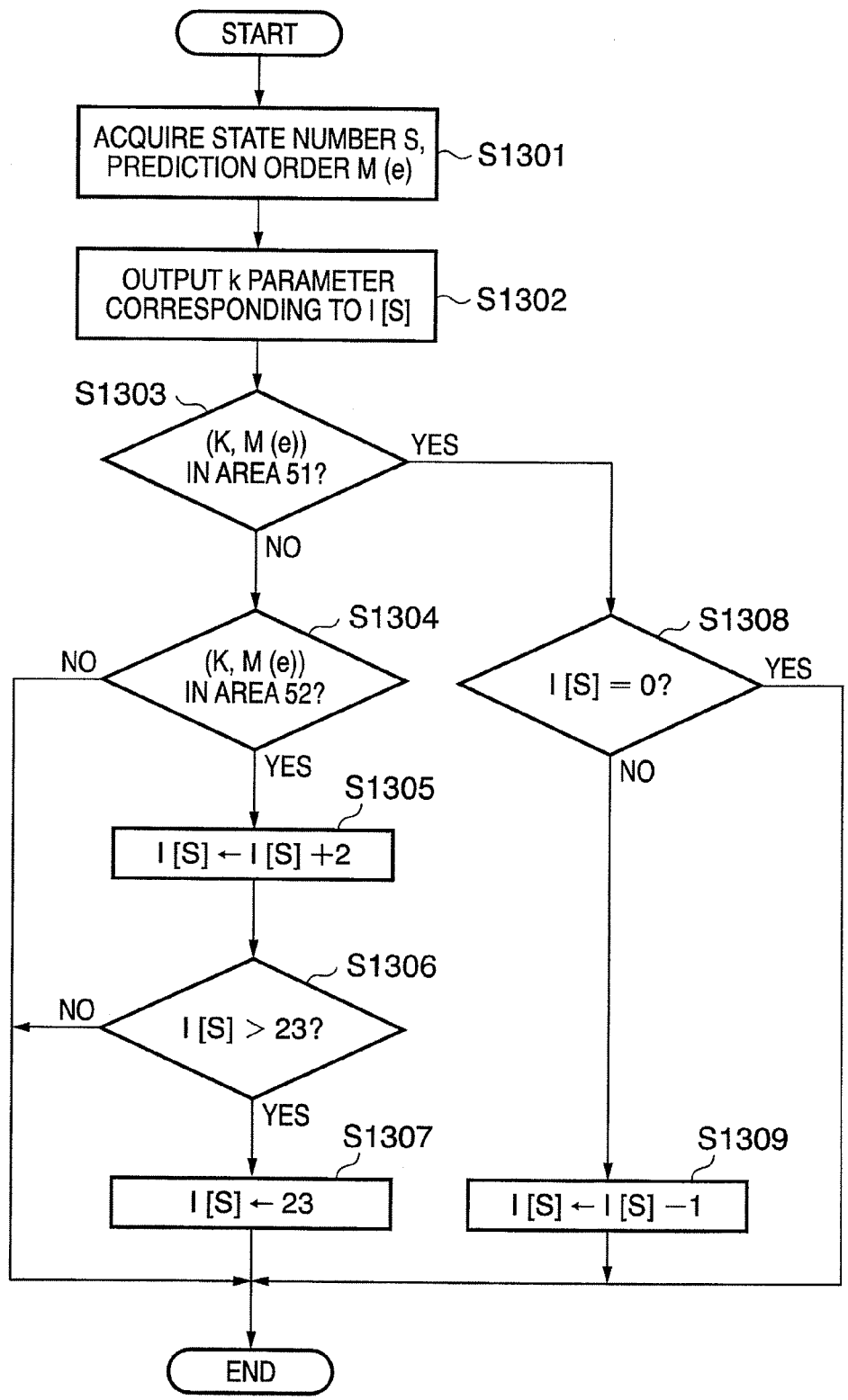
FIG. 13 is a flowchart showing the flow of processing by a k parameter updating unit 1002 in the third embodiment.

FIG. 13 is a flowchart showing the flow of processing by the k parameter updating unit 1002 when the pixel of interest x is encoded. The flow of processing performed by the k parameter updating unit 1002 with each pixel will be described using FIG. 13.

The k parameter updating unit 1002 acquires the state number S output from the context generating unit 1001 and the prediction order M(e) output from the prediction order conversion unit 105 (step S1301). The element I[S] of the index value array for the input state number S is removed, and the value of the k parameter corresponding to the removed I[S], obtained with reference to the correspondence table of FIG. 12, is output to the Golomb encoding unit 106 (step S1302). If the value of I[S] for a given state number S is assumed to be 5, for example, the parameter k will be K[I[S]]=K[5] with reference to the correspondence table, so "3" will be output to the Golomb encoding unit 106 as the k parameter. The Golomb encoding unit 106 thereby encodes the prediction order M(e) corresponding to the pixel of interest x.

It is then judged whether the position shown by the current k parameter and the prediction order M(e) is within area 51 (step S1303). If the position belongs to area 51, processing moves to step S1308, whereas if the position does not belong to area 51, processing moves to step S1304.

If the position belongs to area 51, it is examined whether the array element I[S] is zero (step S1308), and if not zero, the value of I[S] is updated by subtracting "1" therefrom (step S1309) If the array element I[S] is zero, further subtraction is not performed.

On the other hand, if it is judged that the position shown by the parameter k and M(e) in step S1303 is outside of area 51, it is judged whether the position is within area 52 (step S1304).

If it is judged that the position is within area 52, the value of I[S] is updated by adding "2"thereto (step S1305). It is also examined whether I[S] exceeds the predetermined maximum value ("23" in the present embodiment) of the index (step S1306), and if the maximum value is exceeded, I[S] is set to the maximum value (step S1307).

If it is judged in step S1304 that the position shown by the parameter k and M(e) does not belong to area 52, this shows that the position is within area 50. Namely, it is determined that the position is in the optimal symbol range, and the index I[S] is not updated. The updated I[S] is used when encoding pixels subsequent to the pixel of interest that have the same state number S.

As is also evident from the above processing, the example shown in the third embodiment involves transition of the index I[S] and the k parameter being carried out quickly in portions where the k parameter is small, and slowly in portions where the k parameter is large.

The encoding system can be designed more freely to match the dynamic properties of the information source for encoding, by introducing index values to control the k parameter indirectly as in the third embodiment, in addition to updating the k parameter by increasing or decreasing the value of k directly.

Other Modifications

The present invention is not limited to the above embodiments. Although an example was shown in which the three prediction equations a, b and a+b−c are adaptively switched using the same method as JPEG-LS to generate prediction errors, other prediction equations such as (a+b)/2 may be applied, for example. Further, any method that generates predicted values from encoded areas is acceptable. For example, a technique may be used in which a pixel value present in the same spatial position as the pixel of interest in the encoded prior frame in a moving image configured from a plurality of frames is made the predicted value.

Predicted values may also be corrected to enhance predictive accuracy by referring to encoded prediction errors, as is employed with JPEG-LS.

The present invention may also be used in combination with measures for improving efficiency, such as predicting and inverting the sign of prediction errors, or reducing dynamic range using modulus conversion.

In the first to third embodiments, configurations are shown in which the updating of the k parameter is judged on the basis of a range at which the code length is smallest. When k=2, for example, parameter updating is not performed if the symbol for encoding (M(e) in the embodiments) is 2 to 11, since this is the optimal symbol range, whereas updating is performed to decrease k if the symbol is 0 or 1, and increase k if the symbol is 12 or higher.

However, correction may be performed to widen or narrow the range if, for example, a range up to "the smallest code length +1" is considered appropriate.

If a range up to "the smallest code length+1" at k=2 is considered appropriate, parameter updating will not be performed for symbol values of 1 to 15, thereby raising parameter stability. Since transition from k=1 to k=0 is not carried out, however, exception processing to not apply the expansion of the range when k=1, for example, is required in this case.

In the above embodiments, an example was shown using a form of Golomb encoding in which the parameter variable m=2^k as entropy coding, although the present invention is not limited to this. This technique may be applied using m≠2^k. Further, this can be applied in relation to derivative forms of Golomb encoding, such as Exponential-Golomb encoding.

In the embodiments, an image processing apparatus that performs encoding/decoding was taken as an example in particular, although the present invention is suitable in an apparatus that performs image encoding or decoding, such as a copier, a printer, or a reader. Because the functions of the embodiments can also be realized by a computer program that is read and executed by a computer, as described previously, the category of the invention naturally includes computer programs. Generally, computer programs are stored on a computer-readable storage medium such as a CD-ROM, which is loaded into the reading apparatus (CD-ROM drive, etc.) of a computer, and become executable by being copied to or installed in a system. Therefore, the category of the invention clearly includes such computer-readable storage media.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-075544, filed Mar. 17, 2006, which is hereby incorporated by reference herein in its entirety.

What is claimed is:

1. An image encoding apparatus that encodes image data based on a dynamic probability distribution model, comprising:
   an input unit that inputs image data in pixel units;
   a symbol generating unit that generates, from pixel data of a pixel of interest input by said input unit, a symbol to be entropy encoded;
   an encoding unit that entropy encodes, according to Golomb coding, the symbol generated by the symbol generating unit using a given encoding parameter "K" defined in Golomb coding and outputs an encoded symbol as a codeword of the symbol;
   a storage unit that stores, for the symbol, information representing a target range of the encoding parameter "K" to generate a codeword having a length within a target length;
   a judging unit that judges, referring the storage unit, whether the encoding parameter "K" used when the symbol is encoded by the encoding means is within a target range for the symbol, exceeds an upper limit of the target range, or falls below a lower limit of the target range; and
   an updating unit that updates, based on a result of the judgment by the judging unit, the encoding parameter "K" to prepare for entropy encoding a subsequent pixel.

2. The image encoding apparatus according to claim 1, wherein said symbol generating unit includes:
   a predicted value calculating unit that calculates a predicted value for pixel data of interest from at least one of pixels, which had been encoded, neighboring the pixel data of interest;
   a prediction error calculating unit that calculates a prediction error, being a difference between the calculated predicted value and the pixel data of interest; and
   a conversion unit that converts a plus/minus sign of the calculated prediction error to a distinguishable non-negative integer value,
   wherein the symbol generating means unit generates the non-negative integer value converted by the conversion unit as the symbol.

3. The image encoding apparatus according to claim 1, wherein if the encoding parameter currently "K" used when the encoding unit encodes the symbol generated from the pixel of interest defined as "Kc", and a lower limit and an upper limit of the target range for the symbol are respectively defined as KSmin and KSmax,
   the updating unit determines, as the encoding parameter "K" to be used for entropy encoding a subsequent pixel, a value obtained by:
   increasing the encoding parameter Kc if Kc <KSmin,
   decreasing the encoding parameter Kc if KSmax <Kc, and
   maintaining the value of the encoding parameter Kc if KSmin ≦Kc ≦KSmax.

4. The image encoding apparatus according to claim 1, further comprising:
   a state information calculating unit that calculates state information S for a position of a pixel of interest X, based on data of pixels, which had been encoded, neighboring the pixel of interest X; and
   an encoding parameter storage unit that stores an encoding parameter array K of a possible range of the state information S,
   wherein the encoding unit performs the encoding in accordance with an encoding parameter K specified by the state information S of the pixel data of interest, and
   the updating unit updates the encoding parameter K to prepare for entropy encoding subsequent pixel.

5. The image encoding apparatus according to claim 4, wherein if the encoding parameter used when the symbol is encoded by the encoding unit is defined as K, and a lower limit and an upper limit of the target range of the encoding parameter at which the length of codeword of the symbol is within the target code length are respectively defined as KSmin and KSmax, the updating unit determines, as the encoding parameter K to be used for entropy encoding a subsequent pixel, a value obtained by:

increasing the encoding parameter K if K<KSmin, decreasing the encoding parameter K by a probability of less than 1 if KSmax <K, and maintaining the value of the encoding parameter K if KSmin ≦K≦KSmax.

6. The image encoding apparatus according to claim 1, further comprising:

a state information calculating unit that calculates state information S for a position of a pixel of interest X, based on data of pixels, which had been encoded, neighboring the pixel of interest X;

an index storage unit that stores an index array i of a possible range of the state information S obtained by the state information calculating unit, and an encoding parameter storage unit that stores an encoding parameter array K of a possible range of the index array i, wherein the encoding means unit performs the encoding in accordance with an encoding parameter K specified by the state information S of the pixel data of interest, and the updating unit updates the encoding parameter K in order to prepare for entropy encoding subsequent pixel.

7. The image encoding apparatus according to claim 6, wherein if the encoding parameter used when the symbol is encoded by the encoding unit is defined as K, and a lower limit and an upper limit of the target range of the encoding parameter at which the length of codeword of the symbol is within the target code length are respectively defined as KSmin and KSmax, the updating unit determines, as the encoding parameter "K" to be used for entropy encoding a subsequent pixel, a value obtained by:

increasing the encoding parameter K by a preset correction value α if K<KSmin, decreasing the encoding parameter K by a correction value β that is smaller than the correction value α if KSmax <K, and maintaining the value of the encoding parameter K if KSmin ≦K≦KSmax.

8. A control method for an image encoding apparatus that encodes image data based on a dynamic probability distribution model, comprising:

an input step of inputting image data in pixel units;

a symbol generating step of generating, from pixel data of a pixel of interest input in the input step, a symbol to be entropy encoded;

an encoding step of entropy encoding, according to Golomb coding, the symbol generated in the symbol generating step using a given encoding parameter "K" defined in Golomb coding and output an encoded symbol as a codeword of the symbol;

a judging step of judging, referring a storage unit, whether the encoding parameter "K" used when the symbol generated from a pixel data of interest is encoded in the encoding step is within a target range for the symbol, exceeds an upper limit of the target range, or falls below a lower limit of the target range, where the storage unit stores, for the symbol, information representing the target range of the encoding parameter "K" to generate the codeword having a length within a target length; and an updating step of updating, based on a result of the judgment in the judging step, the encoding parameter "K" to prepare for entropy encoding a subsequent pixel.

9. A non-transitory computer-readable storage medium storing a computer program for causing a computer to function as an image encoding apparatus as claimed in claim 1 as a result of the computer reading and executing the stored computer program.

10. An image decoding apparatus that decodes encoded image data based on a dynamic probability distribution model, comprising:

an input unit that inputs encoded data in pixel units;

a decoding unit that decodes, according to Golomb coding, the encoded data input by the input means using a given decoding parameter "K" defined in Golomb coding and outputs decoded data as a symbol for a pixel of interest;

an image data restoring unit that restores pixel data of the pixel of interest from the symbol obtained by the decoding unit;

a storage unit that stores, for the symbol, information representing a target range of an encoding parameter, as the decoding parameter "K", to be used for generating a codeword having a length within a target length;

a judging means for judging, referring the storage unit, whether the decoding parameter "K" used when the symbol is decoded by the decoding unit is within the target range for the symbol, exceeds an upper limit of the target range, or falls below a lower limit of the target range; and an updating unit that updates, based on a result of the judgment by the judging unit, the decoding parameter "K" to prepare for entropy decoding a subsequent pixel.

11. A control method for an image decoding apparatus that decodes encoded image data based on a dynamic probability distribution model, comprising:

an input step of inputting encoded data in pixel units;

a decoding step of decoding, according to Golomb coding, the encoded data input in the input step using a given decoding parameter "K" defined in Golomb coding and outputting decoded data as a symbol for a pixel of interest;

a restoring step of restoring pixel data of the pixel of interest from the symbol obtained in the decoding step;

a judging step of judging, referring a storage unit, whether the decoding parameter "K" used when the symbol is decoded in the decoding step is within a target range for the symbol, exceeds an upper limit of the target range, or falls below a lower limit of the target range, where the storage unit stores, for the symbol, information representing a target range of an encoding parameter, as the decoding parameter "K", to be used for generating a codeword having a length within a target length; and an updating step of updating, based on a result of the judgment in the judging step, the decoding parameter "K" to prepare for entropy decoding a subsequent pixel.

12. A non-transitory computer-readable storage medium storing a computer program for causing a computer to function as an image decoding apparatus as claimed in claim 11 as a result of the computer reading and executing the stored computer program.

* * * * *